(12) United States Patent
Park et al.

(10) Patent No.: US 8,995,261 B2
(45) Date of Patent: Mar. 31, 2015

(54) METHOD AND APPARATUS OF NETWORK TRAFFIC OFFLOADING

(71) Applicant: LG Electronics Inc., Seoul (KR)

(72) Inventors: Jong Hyun Park, Anyang-si (KR); Ill Soo Sohn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 13/654,332

(22) Filed: Oct. 17, 2012

(65) Prior Publication Data

US 2013/0286826 A1 Oct. 31, 2013

Related U.S. Application Data

(60) Provisional application No. 61/548,200, filed on Oct. 17, 2011.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 28/02* (2009.01)

(52) U.S. Cl.
CPC .................. *H04W 28/0231* (2013.01)
USPC ......................................... 370/230

(58) Field of Classification Search
CPC ......... H04L 47/12; H04L 45/74; H04L 45/50; H04L 45/745; H04L 45/7453; H04L 12/4641; H04W 28/0268; H04W 28/0289; H04W 28/0231; H04W 48/06
USPC .................. 370/230, 390, 331, 328, 345, 338
See application file for complete search history.

(56) References Cited

U.S. PATENT DOCUMENTS

| | | | |
|---|---|---|---|
| 2004/0199808 A1* | 10/2004 | Freimuth et al. | 714/4 |
| 2011/0222523 A1* | 9/2011 | Fu et al. | 370/338 |
| 2011/0267948 A1* | 11/2011 | Koc et al. | 370/235 |
| 2011/0305139 A1* | 12/2011 | Kwak et al. | 370/230 |
| 2011/0319073 A1* | 12/2011 | Ekici et al. | 455/426.1 |
| 2013/0111038 A1* | 5/2013 | Girard | 709/226 |

* cited by examiner

*Primary Examiner* — Andrew Chriss
*Assistant Examiner* — Atique Ahmed
(74) *Attorney, Agent, or Firm* — Lee, Hong, Degerman, Kang & Waimey

(57) ABSTRACT

Method and apparatus of network traffic offloading is disclosed. Network traffic offloading method may include receiving a first network traffic offloading frame from a base station in a cellular network, the first network traffic offloading frame comprising a frame type instructing a scanning start by broadcasting an advertising frame, traffic information indicating traffic expected to be offloaded by the base station and a transmission configuration indicating a period and a duration to transmit the advertising frame, broadcasting the advertising frame based on the transmission configuration to scan at least one access point (AP), receiving at least one invitation frame from the at least one AP and transmitting a probe request frame to an AP selected among the at least one AP to associate with the selected AP.

14 Claims, 12 Drawing Sheets

FIG. 2

| Offloading frame Type: 0 for Scan Start (210) | Requester Address (220) | Traffic Type (230) | Access Category (240) | Avg Data Rate (250) | Min Data Rate (260) | Advertising Period (270) | Advertising Duration (280) |
|---|---|---|---|---|---|---|---|

Network traffic offloading frame(200)(Type: Scan Start)

FIG. 3

| STA's MAC Address | Requester Address | Traffic Type | Access Category | Avg Data Rate | Min Data Rate |
|---|---|---|---|---|---|
| (310) | (320) | (330) | (340) | (350) | (360) |

Advertising frame(300)

FIG. 5

| Offloading frame Type: 1 for Scan Renew (510) | Requester Address | Traffic Type | Access Category | Avg Data Rate | Min Data Rate | Advertising Period (520) | Advertising Duration (530) |
|---|---|---|---|---|---|---|---|
| | | | | | | | |

Network traffic offloading frame(Type: Scan Renew)(500)

FIG. 6

| Offloading frame Type: 2 for Scan Start (610) | Reason Code (620) |
|---|---|

Network traffic offloading frame
(Type: Scan Stop)(600)

FIG. 7

| Offloading frame Type: 3 for Status Check (710) | Status Code (720) |
|---|---|
| | |

Network traffic offloading frame
(Type: status check)(700)

FIG. 8

| AP MAC Address | BSSID | Capability | Operating Bandwidth | Supported Rata | Power Constraint | BSS Load element | ... |
|---|---|---|---|---|---|---|---|
| (810) | (820) | (830) | (840) | (850) | (860) | (870) | |

Invitation frame format(800)

Offloading status Report
frame format(900)

FIG. 10

| Offloading frame Type: 4for AP Found (1010) | AP MAC Address | BSSID | Capability | Operating Bandwidth | Supported Rata | Power Constraint | BSS Load element | ... |

Network traffic offloading frame (Type:AP Found)(1000)

FIG. 11

| AP MAC Address | STA MAC Address | BSS Load element | Reason Code | ... |
|---|---|---|---|---|
| (1110) | (1120) | (1130) | (1140) | |

Offloading End Recommendation frame(1100)

METHOD AND APPARATUS OF NETWORK TRAFFIC OFFLOADING

CROSS-REFERENCE TO RELATED APPLICATION

Pursuant to 35 U.S.C. §119(e), this application claims the benefit of U.S. Provisional Application No. 61/548,200 filed on Oct. 17, 2011, the contents of which are herein incorporated by reference in its entirety.

BACKGROUND OF THE INVENTION

1. Field of the Invention

The present invention relates to wireless communications and in particular to a method and apparatus of traffic offloading in a network.

2. Discussion of the Related Art

Recently, a machine-to-machine (M2M) system may be considered, which system comes into the spotlight as the next generation communication technology and is enacted as a new standard so as to also support in the IEEE 802.11 WLAN. The M2M system means a network to transmit and receive information in which a communication subject as machines rather than people. Large machines such as process machinery in a plant, automobiles and the like may be also elements of the M2M system including the home appliances such as temperature or humidity sensors, a camera, a TV and the like. Recently, according to the introduction of a variety of communication services such as smart grids, e-Health, and ubiquitous services, the M2M technologies are utilized to support the services. The characteristics of the M2M system are as follows:

1) A large number of stations: It is assumed that the M2M terminal includes a large number of stations unlike the existing network. This is because all sensors installed at home, company, etc. may be considered as well as machines owned by individuals. Thus, the large number of stations may be connected to one AP.

2) A low traffic load for each station: The M2M terminal is not required to transmit information frequently and the amount of information is less since it has traffic patterns that collects and reports the surrounding information.

3) Uplink center: The M2M terminal has a structure that receives commands by mainly downlink and then reports the resulted data by uplink. Since the main data is usually transmitted by the uplink, the uplink is centered in the M2M terminal.

4) Long life of Station: The M2M terminal is mostly battery-operated, and it is often difficult to charge the battery frequently by users. Thus, the M2M terminal is required to ensure a long life by minimizing battery consumption.

5) Auto-recovery function: The M2M terminal is required to have an auto-recovery function since they are difficult to directly manipulate the terminal in a particular situation.

The IEEE 802.11ah standard is being discussed as one use case of such a M2M communication. The main feature of the standard is that the unlicensed band of sub-1 GHz, except for the TV white space band, has much wider coverage (up to 1 km) than that of the WLAN in the center of the existing indoor. That is, when the WLAN is used in the sub 1 GHz band represented as 700-900 MHz different from the existing 2.4 GHz or 5 GHz, the coverage of the AP is extended about 2-3 times due to propagation characteristics of the corresponding band, compared to the same transmission power.

This case has a feature in that the large number of STAs may be connected to one AP. The use case considered in the IEEE 802.11ah standard can be summarized as follows:

Use Case 1: Sensors and meters
1a: Smart Grid—Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and meter data
Backhaul aggregation of sensors
Backhaul aggregation of industrial sensors
Use Case 3: Extended range Wi-Fi
Outdoor extended range hotspot
Outdoor Wi-Fi for cellular traffic offloading In the Use Case 1, which is the use case on the M2M communication using sensors and meters as described above, the various types of sensor devices can be connected to the 802.11ah AP to perform the M2M communication. In particular, in a case of the smart grid, the maximum 6,000 sensor devices may be connected to one AP.

In the Use Case 2, which is a case of the backhaul sensor and meter data, the 802.11ah AP that provides a wider coverage would serve as the backhaul link of other system such as the 802.15.4 g.

In the Use Case 3, it may be the use case aimed for outdoor extended range hotspot communication such as an extended home coverage, a campus wide coverage, shopping malls and the case aimed for distribution of the overflowing cellular traffic by which the 802.11ah AP supports traffic offloading of the cellular mobile communication.

SUMMARY OF INVENTION

An object of present invention is to provide a method of traffic offloading in a network.

Another object of the present invention is to provide an apparatus for performing a method of traffic offloading in a network.

To achieve the object of the present invention, traffic offloading method may include receiving a first network traffic offloading frame from a base station in a cellular network, the first network traffic offloading frame comprising a frame type instructing a scanning start by broadcasting an advertising frame, traffic information indicating traffic expected to be offloaded by the base station and a transmission configuration indicating a period and a duration to transmit the advertising frame, broadcasting the advertising frame based on the transmission configuration to scan at least one access point (AP), receiving at least one invitation frame from the at least one AP and transmitting a probe request frame to an AP selected among the at least one AP to associate with the selected AP wherein the advertising frame comprises the traffic information and wherein the invitation frame comprises transmitting capability of the AP to decide whether sending the probe request frame or not. The traffic offloading method may further include receiving a second network traffic offloading frame from the base station in the cellular network, wherein the second network traffic offloading frame comprises an indication about a frame type instructing a scanning restart by broadcasting the advertising frames. The traffic offloading method may further include receiving a third network traffic offloading frame from the base station in the cellular network and stopping broadcast of the advertising frames in response to the network traffic offloading frame, wherein the third network traffic offloading frame comprises an indication about the frame type instructing a scanning stop. The third network traffic offloading frame may further include an indication about reasons of the scanning stop. The third network traffic offloading frame may further includes receiving the fourth network traffic offloading frame from the base station in the cellular network, and checking channel state to receive the traffic offloaded by the base station from the AP, wherein the fourth network traffic offloading frame comprises the frame type instructing checking the channel state. The fourth network traffic offloading frame further include an indication about the channel state. The traffic offloading method may further include receiving a offloading end recommendation frame from the AP to disassociate with the AP and disassociating with AP, wherein the offloading end recommendation frame comprises indications about current AP's loading condition and reasons of disassociation. The traffic offloading method may further include receiving a fifth network traffic offloading frame from the base station in the cellular network, the fifth network traffic offloading frame comprising the frame type instructing a AP expected to be associate with and transmitting a probe request frame to the AP.

To achieve the object of the present invention, a wireless device configured to transmit control signals in a wireless communication system may include a transceiver configured to receive a first network traffic offloading frame from a base station in a cellular network, to broadcast the advertising frame based on the transmission configuration to scan at least one access point (AP), to receive at least one invitation frame from the at least one AP in response to the advertising frame, and to transmit the probe request frame to an AP selected among the at least one AP to associate with the selected AP and a processor configured to generate the advertising frame comprising the traffic information, wherein the first network traffic offloading frame comprises a frame type instructing a scanning start by broadcasting an advertising frame, traffic information indicating traffic expected to be offloaded by the base station and a transmission configuration indicating a period and a duration to transmit the advertising frame and wherein the invitation frame comprising transmitting capability of the AP to decide whether sending the probe request frame or not. The transceiver may be further configured to receive a second network traffic offloading frame from the base station in the cellular network, the second network traffic offloading frame comprising an indication about a frame type instructing a scanning restart by broadcasting the advertising frames. The transceiver may be further configured to receive a third network traffic offloading frame from the base station in the cellular network, the third network traffic offloading frame comprising an indication about the frame type instructing a scanning stop and wherein the processor further configured to stop broadcast of the advertising frames in response to the network traffic offloading frame. The third network traffic offloading may further comprise an indication about reasons of the scanning stop. The transceiver may be further configured to receive a fourth network traffic offloading frame from the base station in the cellular network, the fourth network traffic offloading frame comprising indications about the frame type instructing checking the channel state and wherein the processor further configured to check channel state to receive the traffic offloaded by the base station from the AP. The fourth network traffic offloading frame may be further comprise an indication about the channel state. The transceiver may be further configured to receive a offloading end recommendation frame from the AP to disassociate with the AP and disassociating with AP, the offloading end recommendation frame comprising indications about current AP's loading condition and reasons of disassociation. The transceiver may be further configured to receive a fifth network traffic offloading frame from the base station in the cellular network, the fifth network traffic offloading frame comprising the frame type instructing a AP expected to be associate with and to transmit a probe request frame to the AP.

BRIEF DESCRIPTION OF THE DRAWINGS

FIG. 2 is a conceptual diagram illustrating a frame structure of a network traffic offloading frame (scan start, type 0) transmitted from a base station to a STA according to the embodiment of the present invention.

FIG. 3 is a conceptual diagram illustrating a frame structure of an advertising frame according to the embodiment of the present invention.

FIG. 5 is a conceptual diagram illustrating the network traffic offloading frame that instructs the scan renew according to the embodiment of the present invention.

FIG. 6 is a conceptual diagram illustrating the network traffic offloading frame that instructs the scan stop according to the embodiment of the present invention.

FIG. 7 is a conceptual diagram illustrating the network traffic offloading frame that transmits the status code according to the embodiment of the present invention.

FIG. 8 is a conceptual diagram illustrating the invitation frame according to the embodiment of the present invention.

FIG. 10 is a conceptual diagram illustrating a network traffic offloading frame of an AP found type according to the embodiment of the present invention.

FIG. 11 is a conceptual diagram illustrating an offloading end recommendation frame according to the embodiment of the present invention.

DETAILED DESCRIPTION OF THE EMBODIMENTS

Hereinafter, for convenience, the embodiments disclosed in the present invention will be described under an assumption in which overflowing cellular traffic is distributed in a M2M (machine to machine) system due to the fact that an AP (access point) supports traffic offloading of cellular mobile communications. However, the description proposed in the present invention is limited to thereof and may be variously applied to typical WLAN (wireless network) systems.

Figure 1:
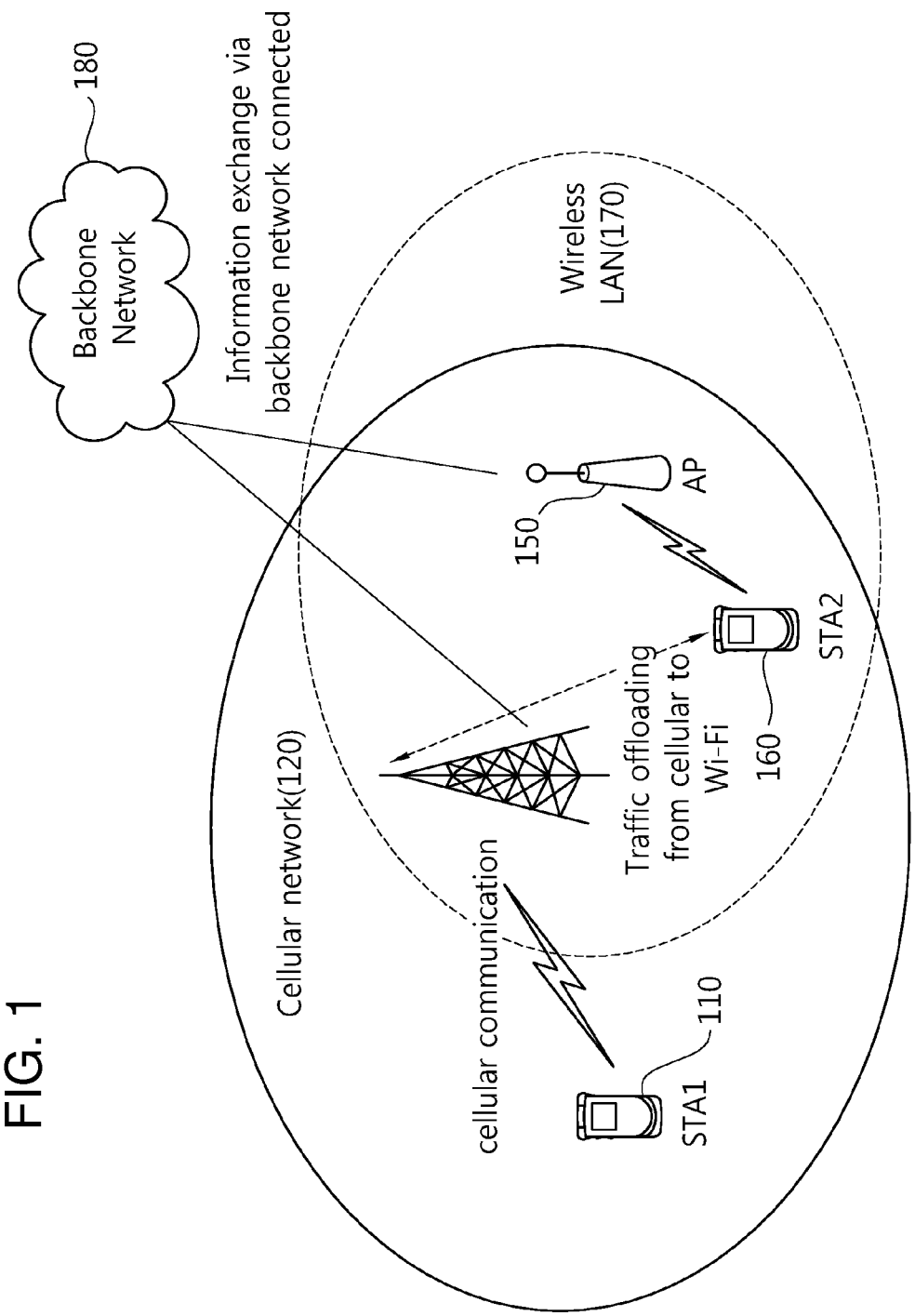
FIG. 1 shows a conceptual diagram representing a network traffic offloading situation.

FIG. 1 shows a conceptual diagram representing a network traffic offloading situation.

Referring to FIG. 1, it may be assumed that STAs (110, 160) are included in a coverage of a cellular network (120) based on a base station (100) and one STA (160) of the STAs (110, 160) included in a coverage of a wireless LAN (170) based on the IEEE 802.11 of an AP (access point, 150).

A backbone network (180) may be set between the cellular network (120) and the wireless LAN (170) so that the two networks can exchange data with each other.

The network traffic offloading relates a method for distributing the traffic that generated from one network to another network. If one network generates a lot of traffic, the lot of traffic can be distributed to another network that does not generate a lot of traffic relatively.

For example, when excessive traffic generates on the cellular network (120), the STAs (110, 160) may not have enough resources for which the STAs (110, 160) that exists in the coverage of the base station (100) may be connected to the cellular network. In this case, the traffic offloading can be performed through the AP (150), by changing access networks of the STA (160) that exists in the coverage of the LAN.

As shown in FIG. 1, it may be assumed that other networks that can provide network traffic offloading exist and a backhaul connection is provided so as to enable information exchange between respective networks. Hereinafter, in this embodiment of the present invention, a network already connected before the STA performs the traffic offloading mechanism is referred to as a first network, and a network newly connected to the STA by the traffic offloading mechanism is referred to as a second network.

Hereinafter, the embodiment of the present invention discloses the effective network traffic offloading mechanism, including the following methods (1) to (3):

(1) A traffic offloading method for which the STA (station) is connected to the second network from the first network;

(2) A method for which the STA exchanges data with the first network during being connected to the second network; and (3) A method for which the STA again returns to the first network when being disconnected to the second network.

As described above, for convenience, the present invention explains under an assumption in which the cellular network may be a first network, the WLAN (or Wi-Fi) based on the 802.11ah may be a second network, and the cellular mobile traffic may be offloaded to the 802.11ah AP. However, the present invention is not limited to the networks. Thus, a case in which the traffic is offloaded from one network to another network may be applied commonly.

In general, it is assumed that the STAs have not mobility or are nomadic in the WLAN environment. However, most of cellular mobile stations may have mobility within the network. That is, traffic offloading is performed, and the cellular mobile stations are connected to the AP to perform networking with the AP. Thus, if the cellular mobile stations have not mobility to a certain extent, or are nomadic, it may be more effective.

It may be assumed that the STA frequently being moved is connected to the AP for the traffic offloading. In this case, even after the STA and the AP perform the association, frequent decoding errors may actually occur when transmitting and receiving data packets between the STA and the AP. This is because a preamble or the like of the WLAN is designed considering communications between static or nomadic STAs. Therefore, in the embodiment of the present invention, the traffic offloading mechanism to consider the mobility of unpredictable STAs is needed.

If the STA broadcasts the advertising frames during moving, the possibility of failure will be increased in decoding the advertising frames by the surrounding AP. On the other hand, if the STA has broadcasted the advertising frames in the static state or nomadic state, the surrounding AP can correctly decode the advertising frames.

The AP determines whether traffic offloading is possible based on information such as traffic load situations of a BSS (basic service set) of the AP itself, data rate that requests offloading, traffic types and the like, after receiving the advertising frames so that it may be responded to advertising frames with invitation frames for the connection request to the STA.

The traffic offloading mechanism according to the embodiment of the present invention is described briefly and the mechanism may be performed through the following:

(1) The network traffic offloading frame that is instructed to a particular STA to broadcast the advertising frame may be transmitted, considering the own traffic loading situation at which the base station exists in the cellular network.

In other words, it may be assumed that the STA is on a coverage that can be connected to both the cellular network and the Wi-Fi (or WLAN) network. The advertising frame may be periodically broadcasted, in order to scan the adjacent AP for offloading, according to the network traffic offloading frame transmitted from the base station of the cellular network. In addition, it can be instructed such that the STA stops or resumes the AP scan operation, or disconnects connection with the AP, based on the network traffic offloading frame.

(2) The STA periodically broadcasts the advertising frame.

The STA can periodically broadcasts the advertising frame to perform the scan process of adjacent AP for offloading according the network traffic offloading frame transmitted from the base station of the cellular network.

(3) The AP transmits the invitation frame to the STA.

The AP can receive the advertising frame transmitted from the STA and the AP can transmit invitation frame to the STA in response to the advertising frame. The invitation message may be included with information necessary for performing networking within the AP. The invitation frame may be transmitted from the AP to the base station and again transmitted from the base station to the terminal, through the backbone.

(4) When the STA can be connected to the AP, the STA transmits the association request frame to the AP.

(5) In a situation at which the connection for traffic offloading between the AP and the STA is completed, the Offloading End Recommendation message may be transmitted to the cellular BS through the backhaul, or directly transmitted to the STA, in order to disconnect the connection with the STA for reason such as the fact that the AP's loading situation became heavy later.

The traffic offloading mechanism may be performed between the terminal, the base station and the AP. Hereinafter, the embodiment of the present invention will be described with regard to the detail traffic offloading mechanism.

Hereinafter, a name of the frame, a subfield that exists in the frame, and information included in each field disclosed in the present invention may be an embodiment for a subfield included in the frame for explaining the traffic offloading mechanism. That is, the frames used for performing traffic offloading according to the embodiment of the present invention may be used as another frame names, and the subframe included in each frame may be added or deleted, except for fields for performing the intrinsic behavior of each frame. The embodiment of the frame structure may be included in the scope of the right of the present invention.

The values for indicating information transmitted from the subfield and information according to the values may be illustrative and arbitrary. In addition, a portion of the values may be added or deleted. The values for indication and the mapping relation of the value may be also arbitrary.

FIG. 2 is a conceptual diagram illustrating a frame structure of a network traffic offloading frame (scan start, type 0) transmitted from a base station to a STA according to the embodiment of the present invention.

Referring to FIG. 2, a network traffic offloading frame (200) used for transmitting commands to start a scan to the STA may include an offloading frame type (210), a requester address (220), a traffic type (230), an access category (240), an avg data rate (250), a min data rate (260), an advertising period (270), and an advertising duration (280), as subfields.

(1) Offloading Frame Type (210)

The offloading frame type (210) may be a subfield including information on operations by which a terminal that receives the network traffic offloading frame should be performed. FIG. 2 illustrates a frame structure when the offloading frame type (210) has a type '0' value.

Table 1 below shows operations of the terminal according to the values of the offloading frame type.

TABLE 1

| Offloading Frame Type field value | Description |
|---|---|
| 0 | Scan Start (A STA who received this frame shall start to periodically broadcast the Advertising Frame) |
| 1 | Scan Renew (A STA who received this frame shall restart to periodically broadcast the renewed Advertising Frame) |
| 2 | Scan Stop (A STA who received this frame may stop to broadcast the Advertising Frame) |
| 3 | Status Check (A STA who received this frame shall follow the directions while associated to an offloading AP) |
| ... | Reserved |

Referring to Table 1, the terminal receiving the network traffic offloading frame (200) can perform a scan start, a scan renew, a scan stop, a status check and the like according to the values of the offloading frame type (210).

If the offloading frame type (210) is set to 0, the scan start can be instructed to the terminal. The terminal receiving the network traffic offloading frame (200) to which the offloading frame type (210) is set to 0 may periodically broadcast the advertising frame to perform the scan for the AP.

If the offloading frame type (210) is set to 1, the scan renew can be instructed to the terminal. The terminal receiving the network traffic offloading frame (200) to which the offloading frame type (210) is set to 1 may periodically broadcast the renewed advertising frame.

If the offloading frame type (210) is set to 2, the scan stop can be instructed to the terminal. The terminal receiving the network traffic offloading frame (200) to which the offloading frame type (210) is set to 2 may stop the operation to broadcast the advertising frame so as to stop the operation to scan the AP.

If the offloading frame type (210) is set to 3, the status check can be instructed to the terminal. After the STA receives the invitation frame from a particular AP, the association request/response frame is exchanged. Even after it has been successfully connected to the AP, the cellular base station can transmit information for status checks between the AP and the STA to the terminal through the network traffic offloading frame (200) which is set to type 3.

FIG. 2 illustrates a frame structure of a case in which the offloading frame type (210) is set to 0 (scan start) and according to the embodiment of the present invention, when the offloading frame type (210) is set to 1(scan renew), 2(scan stop), and 3(status check), respectively, each frame structure of the network traffic offloading frame (200) will be described in detail.

(2) Requester Address (220)

The requester address (220) may be used as a subfield including address identification information (for example, a MAC address of a base station) of the base station of the cellular network. By transmitting the requester address (220) included in the network traffic offloading frame (200), information of the base station transmitting the network traffic offloading frame (200) can be provided to the terminal. In addition, it may be used for generating the value of the requester address, which is a subfield included in the advertising frame, by the terminal.

(3) Traffic Type (230)

The traffic type (230) may be included with type information of downlink traffic to be transmitted by the base station of the cellular network. In order to indicate the traffic type, the indication values for the traffic type pattern may be already defined and used.

(4) Access Category (240)

The access category (240) may include information on whether the downlink data type by which the base station can be offloaded to the AP is data corresponding to any access category. For example, the access category (240) may be divided into VO (Voice)/VI (Video)/BE (Best Effort)/BK (Background) and the like, depending on the data.

(5) Avg Data Rate (250)

The avg data rate (250) may include information on the average data rate required at the time of data transmission from the AP to the STA after offloading is performed from the base station of the cellular network to the AP of the WLAN.

(6) Min Data Rate (260)

The min data rate (260) may include information on the minimum data rate required at the time of data transmission from the AP to the STA after offloading is performed from the base station of the cellular network to the AP of the WLAN.

(7) Advertising Period (270)

The advertising period (270) may include information on a period for which the STA broadcasts the advertising frame.

(8) Advertising Duration (280)

The advertising duration (280) may include information on the duration for which the STA transmits the advertising frame.

As mentioned above, if the network traffic offloading frame (200) is transmitted from the base station of the cellular network to the STA, the STA can determine whether the advertising frame is transmitted according to the offloading frame type (210). If the offloading frame type (210) of the received network traffic offloading frame (200) is set to 0 or 1, the STA broadcasts the advertising frame.

FIG. 3 is a conceptual diagram illustrating a frame structure of an advertising frame according to the embodiment of the present invention.

Referring to FIG. 3, the advertising frame (300) may include a STA's MAC (medium access control) address (310), a requester address (320), a traffic type (330), an access category (340), an avg data rate (350), and a min data rate (360).

The STA's MAC address (310) may be inserted to the MAC address of the STA that broadcasts the advertising frame (300) and the values of the remainder fields use the values identical with the subfield included in the network traffic offloading frame transmitted from the base station to broadcast the advertising frame (300).

(1) STA's MAC Address (310)

The STA's MAC address (310) may include address information for identifying the STA for advertising frame. The address information may be used with the MAC address of the STA.

(2) Requester Address (320)

The requester address (320) may include address identification information of the base station of the cellular network.

The address identification information may be a MAC address of the base station, for example. If the STA broadcasts the requester address (320) included in the advertising frame, the AP near the STA receiving the advertising frame may know a traffic offloading request is received form the any cellular base station.

(3) Traffic Type (330)

The traffic type (330) may include type information of the downlink traffic to which the base station of the cellular network wanted to transmit. In order to indicate the type information of the downlink traffic, several traffic type patterns may be defined vendor-specifically.

(4) Access Category (340)

The access category (340) may include category information on data packets that are transmitted and/or received to/from the terminal after the particular AP receiving the advertising frame performs the advertising frame transmitted from the STA. That is, the access category can inform the AP of whether the downlink data type by which the base station may be offloaded is data corresponding to any access category, in advance. The AP can determine whether it can transmit and/or receive the data corresponding to a particular access category to and/or the terminal by considering the traffic load situation of the own BSS. For example, the access category may be values of VO (Voice)/VI (Video)/BE (Best Effort)/BK (Background) and the like.

(5) Avg Data Rate (350)

The avg data rate (350) may include the average data rate required at the time of data transmission to the STA after a particular AP receiving the advertising frame transmitted by the STA performs the traffic offloading mechanism. The AP can determine whether it can be responded to traffic offloading transmitted from the base station by considering the available channel bandwidth referring to the values included in the avg data rate (350).

(6) Min Data Rate (360)

The min data rate (360) may include the minimum data rate required at the time of data transmission to the STA after a particular AP receiving the advertising frame transmitted by the STA performs the traffic offloading mechanism. If the traffic loading situation of the BSS is very heavy or the operating bandwidth is not high, and so it is determined that the minimum data rate is not satisfied, the AP may determine that offloading is difficult and thus it may be responded to the advertising signal frame (300).

When the STA broadcasts the advertising frame (300), the STA should broadcast after occupying the medium by contention according to the normal CSMA/CS (carrier sense multiple access with collision avoidance) procedures. The STA do not know that the offloading possible AP exists in any channel. Therefore, it may be connected to the AP through the method in which the advertising frame is broadcasted and a response from the AP is waited, while changing the channels according to a particular pattern for each period indicated by the advertising period field included in the network traffic offloading frame transmitted by the STA.

Figure 4:
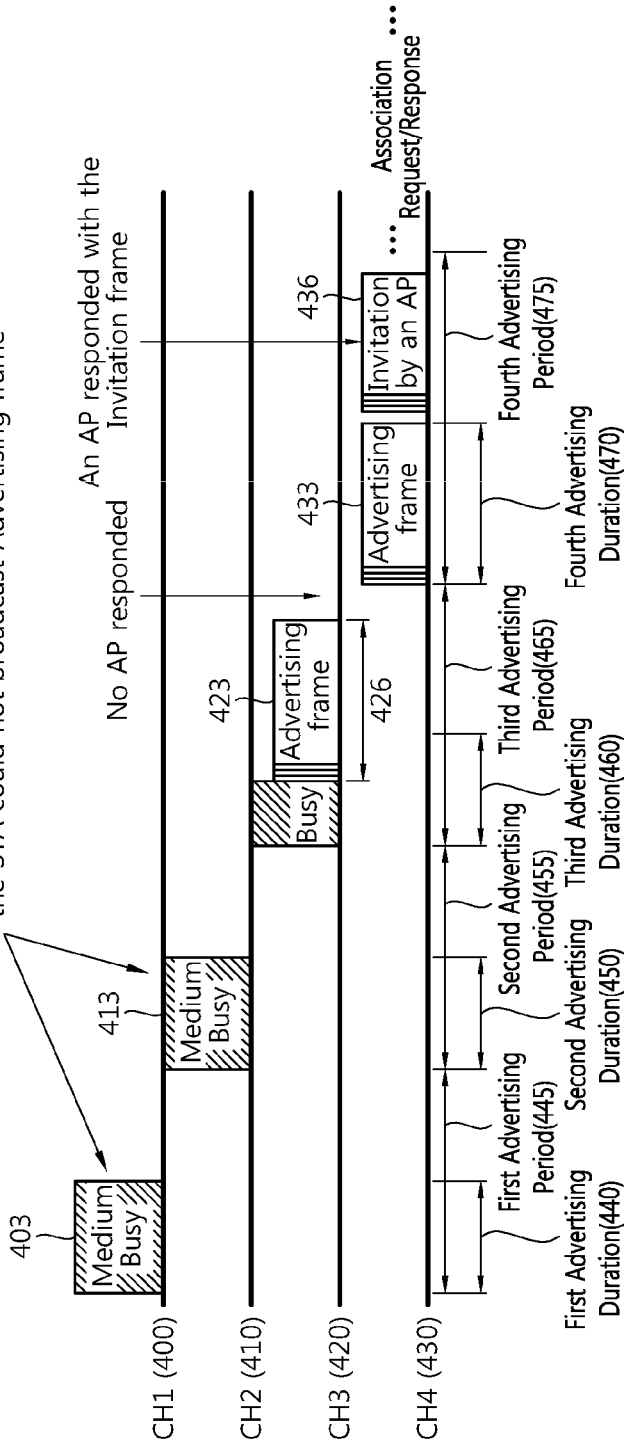
FIG. 4 is a conceptual diagram illustrating a method in which the STA broadcasts an advertising frame and an invitation frame is received from the AP according to the embodiment of the present invention.

FIG. 4 is a conceptual diagram illustrating a method in which the STA broadcasts an advertising frame and an invitation frame is received from the AP according to the embodiment of the present invention.

Referring to FIG. 4, a case in which four channels CH 1 (400), CH 2 (410), CH 3 (420) and CH 4 (430) available in the WLAN exist is assumed and described. In this case, it is supposed and described that the order in which the STA senses the medium for each advertising period has pre-determined as CH 1(400)→CH 2(410)→CH 3(420)→CH 4(430). The order in which the medium and the number of channel available in the WLAN are sensed may be arbitrarily changed.

Based on FIG. 4, the method in which the STA broadcasts the advertising frame and the invitation frame is received from the AP will be described below.

(1) As a result for sensing the medium during a first advertising duration interval (440) for CH 1 (400) by the STA in a first advertising period (445), it is determined that the channel is busy state (403) continuously. Accordingly, the medium sensing can be stopped until the next advertising period interval (455) is arrived.

(2) As a result for sensing the medium of CH 2 (410) during a second advertising duration interval (450) according to the pre-determined order in a second advertising period (455), it is determined that the channel is also busy state (413) continuously.

(3) When a third advertising period (465) is arrived, in sensing the medium of CH 3 (420) during a second advertising duration interval (450) according to the pre-determined order, it may be determined that the medium is idle before a third advertising duration interval (460) is completed. In this case, the STA can attempt contending for access to the medium and the results can occupy the medium to broadcast the advertising frame (423). However, during a certain time-out interval (426) the CH 3 (420) may be not able to receive a response from any AP. In this case, when the fourth advertising period (475) has been arrived, the medium of CH 4 (430) can be sensed according to the determined order.

(4) When the fourth advertising period (475) has been arrived, the STA can sense the medium of CH 4 (430) according to the determined order. If the medium is determined by the idle state, the STA can attempt contending to broadcast the advertising frame (433) after occupying the medium. The terminal can receive the invitation frame (436) in a response to the advertising frame (433) from one AP within a certain time-out interval.

Then, the terminal can access to the AP in the CH 4(430) by transmitting the association request frame to the AP by the STA and again receiving the association response frame from the AP.

According to the above-mentioned method, the traffic offloading can be performed from the base station off the cellular network to the AP.

Hereinafter, the embodiment of the present invention will described with regard to each case in which a scan renew of an offloading frame type 1, a scan stop of an offloading frame type 2 외 scan stop, and a status check of an offloading frame type 3 among network traffic offloading frames may be transmitted from the base station as described above, and a frame structure according to each offloading frame type.

(1) Offloading Frame Type 1 (Scan Renew).

FIG. 5 is a conceptual diagram illustrating the network traffic offloading frame that instructs the scan renew according to the embodiment of the present invention.

For example, before the STA accesses to an AP in FIG. 4, that is, in a situation where the STA does not receive the invitation frame from any AP, the STA can receive the network traffic offloading frame of the offloading frame type 1 that instructs the scan renew from the base station.

Referring to FIG. 5, the frame structure has the same structure as the network traffic offloading frame of the offloading frame type 0 as shown in FIG. 2, except that values included in the offloading frame type (510) may be 1.

When the STA receives the network traffic offloading frame (500) that instructs the scan renew, the terminal can broadcast by reflecting information transmitted from the subfield included in the network traffic offloading frame (500) and updating information included in the subfield of the advertising frame. The STA can broadcast the advertising frame according to an advertising period (520)/an advertising duration (530) transmitted from the network traffic offloading frame (500).

By a variety of reasons, for example, when the data traffic type to be offloaded by the cellular base station has changed, or information such as the data rate has changed, or the advertising period and the advertising duration has changed, the scan renew message may be transmitted to the STA through the network traffic offloading frame.

(2) Offloading Frame Type 2 (Scan Stop)

FIG. 6 is a conceptual diagram illustrating the network traffic offloading frame that instructs the scan stop according to the embodiment of the present invention.

For example, before the STA accesses to an AP in FIG. 4, that is, in a situation where the STA does not receive the invitation frame from any AP, the STA can receive the network traffic offloading frame (600) of the offloading frame type 2 that instructs the scan stop from the base station Referring to FIG. 6, the network traffic offloading frame (600) that instructs the scan stop may have an offloading frame type (610) and a reason code (620).

The value of the offloading frame type (610) can be instructed to allow the STA to stop an operation of scanning the AP with a value of 2.

A reason code (620) may be a field containing information about the reason for that the STA stops the operation of scanning the AP. The reasons for that the STA stops the operation of scanning the AP according to values of the reason code (620) may be as follows.

1) Field Value '0' of the Reason Code

Due to the fact that a traffic loading situation of the base station of the cellular network is mitigated and traffic offloading is no need for the WLAN, it may be indicated that there is no need to perform the operation of scanning the AP by the terminal any longer.

2) Field Value '1' of the Reason Code

If data to be transmitted from the base station of the cellular network to the STA may be delay-sensitive data such as real-time traffic data, when offloading to the WLAN occurs, delay may be generated. Thus, it may indicate to stop the scan operation of the STA so as to not perform traffic offloading to the WLAN.

The scan stop according the reason code (620) above may be arbitrary and the reason code (620) may be added for an additional scan stop.

(3) Offloading Frame Type 3 (Status Code).

FIG. 7 is a conceptual diagram illustrating the network traffic offloading frame that transmits the status code according to the embodiment of the present invention.

For example, it may be assumed that the STA receives the invitation frame from a particular AP and then offloading has been successfully completed by exchanging the association request/response frame between the AP and the STA.

After completing the access to the AP, the STA can receive a network traffic offloading frame (Type: Status Check) (700) from the cellular base station. At this time, the cellular base station can intermittently indicate status information of communications between the AP and the STA passing through an offloaded AP, to the STA through a status code subfield (720).

The status information between the AP and the STA according to values of the status code subfield (720) may be as follows.

1) Status Code Subfield Value 0 (Active)

When the status code subfield value transmitted from the base station may be 0, it may be indicated that the communication state between the STA and the AP is an 'active' state. The active state may indicate that communication between the AP and the STA is a smooth state. The cellular base station can transmit and receive information to and from the AP through a backhaul connection. Based on the backhaul connection between the cellular base station and the AP, the communication between the AP and the STA may be known.

For example, when an ACK may be not received for several times in transmission of buffered data transmitted from the AP to the STA, retransmission of the buffered data may occur many times. When the number of retransmission times occurred during transmitting the buffered data from the AP is less than a certain number, the AP can transmit information about the retransmission to the base station through the backhaul connection. The base station transmits the network traffic offloading frame of the offloading frame type 3 to the STA by setting it to the status code field value '0' and the STA can continuously perform to communicate with the AP since the communication state with the AP is a smooth state.

2) Status Code Subfield Value 1 (Unstable)

When the status code subfield value transmitted from the base station is set to 1, it may be indicated that the communication state between the STA and the AP is an 'unstable' state. The unstable state indicates that communication between the AP and the STA is unstable. However, it may be indicated that a channel state is not the extent enough to stop traffic offloading through the AP.

For example, it is assumed that an ACK is not received for several times in transmission of buffered data transmitted from the AP to the STA, and thus retransmission may occur in a certain range of more or less than a certain number.

The AP can transmit information about the retransmission to the base station through the backhaul connection.

The base station transmits the network traffic offloading frame of the offloading frame type 3 to the STA by setting it to the status code field value '1' and the STA can indicate that the communication state with AP is unstable. Even if the communication is unstable, the STA can continuously perform to communicate with the AP as in the case where the communication state is active.

3) Status Code Subfield Value 2 (Disconnected & Scan Stop)

When the status code subfield value transmitted from the base station is 2, it may determined that a connection with the AP is disconnected and the scan operation stop, as in a state where the communication state between the STA and the AP is not good.

For example, it is assumed that an ACK is not received for several times in transmission of buffered data transmitted from the AP to the STA, and thus retransmission may occur in a certain range of more or less than a certain number (for example, a value greater than the range of the number of the above-mentioned status code subfield value 1), for example, in a case where mobility of the STA has been increased. The AP can transmit information about the number of retransmission to the base station through the backhaul connection.

The base station transmits the network traffic offloading frame of the offloading frame type 3 to the STA by setting it to the status code field value '3' and the STA can determine that the communication state with AP is not good, and the operation scanning the AP is also difficult. Thus, the STA can disconnect the connection with the AP and stop the scan operation.

4) Status Code Subfield Value 3 (Disconnected & Reassociation Required)

When the status code subfield value transmitted from the base station is 3, it may request that a connection with the AP is disconnected as in a state where the communication state between the STA and the AP is not good and a reassociation operation with the AP performs to the STA.

For example, it is assumed that an ACK is not received for several times in transmission of buffered data transmitted from the AP to the STA, and thus retransmission may occur in a certain range of more or less than a certain number (for example, a value greater than the range of the number of the above-mentioned status code subfield value 1).

The AP can transmit information about the number of retransmission to the base station through the backhaul connection.

The base station transmits the network traffic offloading frame of the offloading frame type 3 to the STA by setting it to the status code field value '3' and the STA can determine that the communication state with AP is not good and again set the connection with the AP.

5) Status Code Subfield Value 4 (Offloading End Recommendation)

When the status code subfield value transmitted from the base station is 4, it may request that communication with the WLAN is terminated to again perform communication by performing the cellular network and the association.

For example, when the traffic state of the cellular network is improved, the base station previously performs traffic offloading to transmit the network traffic offloading frame of the status code subfield value 4 to the terminal that performs communication with the WLAN. Accordingly, the base station stops offloading with the WLAN and requests to perform communication based on the cellular network again.

Referring back to FIG. 4, when the AP receives the advertising frame of the terminal, in response to this, the invitation frame can be transmitted from the AP to the terminal.

FIG. 8 is a conceptual diagram illustrating the invitation frame according to the embodiment of the present invention.

Referring to FIG. 8, the invitation frame (800) may include an AP MAC address (810), a BSSID (820), capability (830), an operating bandwidth (840), a supported rate (850), power control (860), a BBS load element (870) and the like.

(1) The AP MAC address (810) includes address information of the AP that invites the STA to allow the STA to know an address of the AP that transmits the invitation frame. The address of the AP may be information about the AP MAC address.

(2) The BSSID (820) may include ID information for instructing the BSS to which the AP exists.

(3) The capability (830) may include information about operations selectively performed in a frame transmitted by the AP.

(4) The operating bandwidth (840) may include information about frequency bandwidths operated by the AP.

(5) The supported rate (850) may include information about data rate that may be provided by the AP.

(6) The power control (860) may include information about a power control method that may be performed by the AP.

(7) The BBS load element (870) may include information about a current traffic state in the BSS including the AP.

The terminal receiving the invitation frame (800) can determine whether the STA is connected to the AP based on subfield information included in the invitation frame (800). When the connection from the STA to the AP is determined based on the invitation frame (800), the STA can request association by transmitting an association request frame to the AP.

The association response, which is a response to the association request frame, may be received from the AP and the STA can be connected to the AP.

After the STA is connected to the AP, the STA can transmit information about a status where current offloading is performed to the cellular base station through the offloading status report frame.

Figure 9:
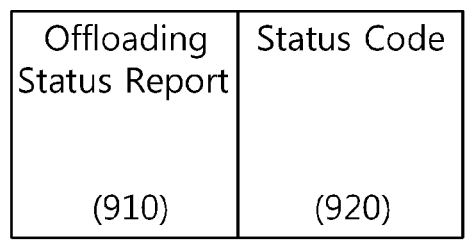
FIG. 9 is a conceptual diagram illustrating an offloading status report frame according to the embodiment of the present invention.

FIG. 9 is a conceptual diagram illustrating an offloading status report frame according to the embodiment of the present invention.

Referring to FIG. 9, the offloading status report frame (900) may include an offloading status report (910) and a status code (920).

1) The offloading status report (910) may be used as information for indicating that the frame is the offloading status report frame.

2) The status code (920) may indicate different AP and STA states according to values of the field.

When the status code (920) is 0, it may be indicated that communication between the STA and the AP is stable as an 'active' state after the STA to traffic offloading is connected to the WLAN.

When the status code (920 is 1, it may be indicated that communication between the STA and the AP is unstable as an 'unstable' state after the STA to traffic offloading is connected to the WLAN.

If the status code in the offloading status report frame (900) is 1, due to the fact that decoding errors for buffered data transmitted from the AP occur, when the number requesting retransmission to the AP is equal to or greater than a certain number, it may be determined that messages is transmitted from the STA to the base station. For example, if mobility of the STA is increased, due to the fact that the STA generates a lot of errors from the received data, the number of requesting the retransmission may be more than a certain number. The STA can set the status code (920), which is subfield of the offloading status report frame (900), to 1 and transmit a set status code to the base station of the cellular network. The base station sets the offloading frame type of the network traffic offloading frame to a status check and transmits a set frame type to the STA. Accordingly, the STA can perform reassociation with the AP or the STA can terminate offloading so that it may be again connected to the cellular network.

If the status code (920) is 2, after the STA is connected to the WLAN, it may be indicated that communication between the STA and the AP has been disconnected.

For example, if data is not transmitted from the AP to the STA, the data can be transmitted from the STA to the base station of the offloading status cellular network at which is the status code (920) is 2. The base station sets the offloading frame type of the network traffic offloading frame to the status check and transmits a set frame type to the STA. Accordingly, the STA can perform reassociation with the AP or the STA can terminate offloading so that it may be again connected to the cellular network.

According to another embodiment of the present invention, the base station of the cellular network can be instructed to the STA such that the advertising frame may be transmitted and the AP that receives the advertising frame transmitted by the STA can transmit information actively indicating that traffic offloading is possible to the base station, deviating from the method of transmitting the invitation frame.

FIG. 10 is a conceptual diagram illustrating a network traffic offloading frame of an AP found type according to the embodiment of the present invention.

Referring to FIG. 10, the network traffic offloading frame (1000) transmitted from the AP is identified with the invitation frame described in FIG. 8, or additionally an offloading frame type subfield (1010) may be added. An offloading frame type value '4' may be used for transmitting information, which is referred to as an AP found type.

In other words, the AP can transmit messages, such as the invitation frame, on which the AP can perform the offloading for the STA through the backbone, to the cellular base station. The base station receiving the invitation frame through the backhaul link can transmit the network traffic offloading frame (type: AP Found) (1000) to the STA. The STA receiving the network traffic offloading frame (type: AP Found) (1000) can transmit the association request frame to the corresponding AP.

In such a method, since the invitation frame is passed through the cellular base station through the backhaul and again transmitted to the STA, a more delay may generate in terms of information transmission. However, the invitation frame is transmitted from a plurality of APs, what to perform the association with any AT can be determined by the base station, not the STA.

In addition, after traffic offloading, it may be assumed that the traffic loading situation of the AP has been heavy. In this case, the AP can transmit the offloading end recommendation frame to the STA to instruct such that the connection from the STA to the AP may be stopped and the traffic offloading to the cellular network may be again performed FIG. 11 is a conceptual diagram illustrating an offloading end recommendation frame according to the embodiment of the present invention.

Referring to FIG. 11, the offloading end recommendation frame (1100) may include an AP MAC address (1110), a STA MAC address (1120), a BSS load element (1130), and a reason code (1140).

1) The AP MAC address (1110) may be included with address information of the AP that transmits the offloading end recommendation frame.
2) The STA MAC address (1120) may be included with address information of the STA that receives the offloading end recommendation frame.
3) The BSS load element (1130) may be included with information that indicates traffic loading states of the BSS belongs to the AP.
4) The reason code (1140) may be included with information on the reason for which the AP wants to stop the offloading.

Figure 12:
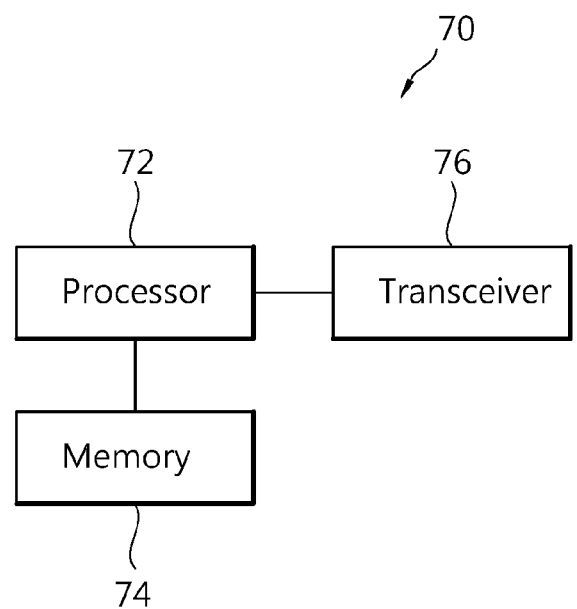
FIG. 12 is a block diagram illustrating a wireless device to which the embodiment of the present invention can be applied.

FIG. 12 is a block diagram illustrating a wireless device to which the embodiment of the present invention can be applied.

The wireless device (70) may be an AP or non-AP STA (non-AP station) as a terminal that can implement the above-mentioned embodiment.

The wireless device (70) may include a processor (72), a memory (74) and a transceiver (76). The transceiver (76) may transmit/receive radio signals, wherein the physical layer of the IEEE 802.11 is implemented. The processor (72) may be functionally connected to the transceiver (76) to implement the MAC layer and physical layer of the IEEE 802.11. The processor (72) may generate a network traffic offloading frame, an advertising frame, offloading status report frame, an offloading end recommendation frame and the like according to the embodiment of the present invention. The information disclosed in the embodiment of the present invention as described above may be included in the each frame. The processor (72) may be set up to implement the above-described embodiment of the present invention. The transceiver (76) can transmit/receive the frames.

The processor (72) and/or transceiver (76) may include an ASIC (application-specific integrated circuit), other chipsets, a logic circuit and/or a data processing device. The memory (74) may include a ROM (read-only memory), a RAM (random access memory), a flash memory, a memory card, a storage media and/or other storage devices. When the embodiment may be implemented in software, the above-mentioned techniques may be implemented as modules (process, function, etc.) to perform the above-mentioned functions. The module may be stored in memory (74) and executed by the processor (72). The memory (74) may be provided to the inside or outside of the processor (72) and connected to the processor (72) by a variety of well-known means.

As mentioned above, according to an embodiment of the present invention, in a case in which traffic that occurs on a particular network such as a cellular network is heavy, the method and apparatus of traffic offloading may be used by performing a traffic offloading mechanism, distributing a portion of the heavy traffic to a WLAN (wireless local area network), using an extended Wi-Fi network, and distributing resources of the cellular network.

The invention claimed is:

1. A method for offloading traffic of a station (STA) from a base station (BS) in a cellular network to an access point (AP), the method comprising:

receiving, by the STA from the BS, a first network traffic offloading frame, the first network traffic offloading frame including a frame type, traffic information, and a transmission configuration, the frame type indicating a start of a scanning by the STA for offloading the traffic from the BS to the AP, the traffic information indicating a data rate required for offloading the traffic from the BS to the AP, and the transmission configuration indicating a period and a duration used to broadcast an advertising frame;

based on the first network traffic offloading frame, scanning by the STA for offloading the traffic from the BS to the AP, the scanning including broadcasting, by the STA to the AP based on the transmission configuration, the advertising frame in order to request an invitation frame from the AP, the advertising frame including the traffic information;

determining, by the STA, whether or not the invitation frame has been received by the STA from the AP in response to the advertising frame broadcasted to the AP;

upon receiving the invitation frame from the AP, transmitting, by the STA to the AP, a probe request frame, the invitation frame sent by the AP to the STA in response to the advertising frame, wherein the invitation frame includes information on a transmission capability of the AP corresponding to the traffic information included in the advertising frame, and wherein the information on the transmission capability includes a data rate supported by the AP.

2. The method of claim 1, further comprising:
when the STA does not receive the invitation frame from the AP in response to the advertising frame broadcasted to the AP, receiving a second network traffic offloading frame from the BS; and
based on the second network traffic offloading frame, updating the traffic information for an advertising frame for a renewal of the scanning,
wherein the second network traffic offloading frame includes a frame type indicating the renewal of the scanning.

3. The method of claim 1, further comprising:
when the STA does not receive the invitation frame from the AP in response to the advertising frame broadcasted to the AP, receiving a third network traffic offloading frame from BS; and
based on the third network traffic offloading frame, stopping the broadcasting of the advertising frame,
wherein the third network traffic offloading frame includes a frame type indicating the stopping of the scanning.

4. The method of claim 3, wherein the third network traffic offloading frame further includes information on at least one reason for the stopping of the scanning.

5. The method of claim 1, further comprising:
establishing an association with the AP;
receiving a fourth network traffic offloading frame from the BS; and
based on the fourth network traffic offloading frame, checking a channel state between the STA and the AP for receiving traffic data offloaded from BS by the AP,
wherein information on the channel state is included in the fourth network traffic offloading frame,
wherein the information on the channel state is determined by the BS based on information on a number of retransmissions of the AP to the STA after the traffic is offloaded to the AP,
wherein the information on the number of the retransmissions of the AP is transmitted via a backhaul from the AP to the BS, and
wherein the fourth network traffic offloading frame includes a frame type indicating the checking of the channel state.

6. The method of claim 1, further comprising:
establishing an association with the AP; and
receiving a offloading end recommendation frame from the AP for disassociating the STA from the AP,
wherein the offloading end recommendation frame includes an indication on a loading condition of the AP and at least one reason for disassociating the STA from the AP.

7. The method of claim 1, further comprising:
when the STA does not receive the invitation frame from the AP in response to the advertising frame broadcasted to the AP, receiving a fifth network traffic offloading frame from the BS, the fifth network traffic offloading frame indicating an AP with which the STA can expect to be associated; and
transmitting an association request frame to the AP,
wherein the AP indicated in the fifth network traffic offloading frame is determined by the BS based on information on a capability for offloading the traffic transmitted from the AP to the BS via a backhaul.

8. A wireless device configured to offload traffic from a base station (BS) in a cellular network to an access point (AP), the wireless device comprising:
a radio frequency (RF) unit configured to transmit or receive a radio signal; and
a processor operatively coupled with the RF unit and configured to:
receive a first network traffic offloading frame from the BS, the first network traffic offloading frame including a frame type, traffic information, and a transmission configuration, the frame type indicating a start of a scanning by the wireless device for offloading the traffic from the BS to the AP, the traffic information indicating a data rate required for offloading the traffic from the BS to the AP, and the transmission configuration indicating a period and a duration used to broadcast an advertising frame;
based on the first network traffic offloading frame, perform a scan for offloading the traffic from the BS to the AP, the scan including broadcasting, based on the transmission configuration, the advertising frame to the AP in order to request an invitation frame from the AP, the advertising frame including the traffic information;
determine whether or not the invitation frame has been received by the wireless device from the AP in response to the advertising frame broadcasted to the AP;
upon receiving the invitation frame from the AP, transmit a probe request frame to the AP, the invitation frame sent by the AP to the wireless device in response to the advertising frame,
wherein the invitation frame includes information on a transmission capability of the AP corresponding to the traffic information included in the advertising frame, and
wherein the information on the transmission capability includes a data rate supported by the AP.

9. The wireless device of claim 8,
wherein the processor is further configured to
when the wireless device does not receive the invitation frame from the AP in response to the advertising frame broadcasted to the AP, receive a second network traffic offloading frame from the BS; and
based on the second network traffic offloading frame, updating the traffic information for an advertising frame for a renewal of the scanning,
wherein the second network traffic offloading frame includes a frame type indicating the renewal of the scanning.

10. The wireless device of claim 8,
wherein the processor is further configured to
when the wireless device does not receive the invitation frame from the AP in response to the advertising frame broadcasted to the AP, receive a third network traffic offloading frame from the BS; and
based on the third network traffic offloading frame, stop the broadcasting of the advertising frame, and
wherein the third network traffic offloading frame includes a frame type indicating the stopping of the scanning.

11. The wireless device of claim 10, wherein the third network traffic offloading frame further includes information on at least one reason for the stopping of the scanning.

12. The wireless device of claim 8,
wherein the processor is further configured to
establish an association with the AP;
receive a fourth network traffic offloading frame from the BS; and
based on the fourth network traffic offloading frame, check a channel state between the wireless device and the AP for receiving traffic data offloaded from BS by the AP, wherein information on the channel state is included in the fourth network traffic offloading frame,
wherein the information on the channel state is determined by the BS based on information on a number of retransmissions of the AP to the wireless device after the traffic is offloaded to the AP,
wherein the information on the number of the retransmission of the AP is transmitted via a backhaul from the AP to the BS, and
wherein the fourth network traffic offloading frame includes a frame type indicating the checking of the channel state.

13. The wireless device of claim 8,
wherein the processor is further configured to
   establish an association with the AP; and
   receive a offloading end recommendation frame from the AP for disassociating the wireless device from the AP, and
wherein the offloading end recommendation frame includes an indication on a loading condition of the AP and at least one reason for disassociating the wireless device from the AP.

14. The wireless device of claim 8,
wherein the processor further configured to
   when the wireless device does not receive the invitation frame from the AP in response to the advertising frame broadcasted to the AP, receive a fifth network traffic offloading frame from the BS, the fifth network traffic offloading frame indicating an AP with which the wireless device can expect to be associated; and
   transmit an association request frame to the AP, and
wherein the AP indicated in the fifth network traffic offloading frame is determined by the BS based on information on a capability for offloading the traffic transmitted from the AP to the BS via a backhaul.

* * * * *